US006638314B1

(12) United States Patent
Meyerzon et al.

(10) Patent No.: US 6,638,314 B1
(45) Date of Patent: Oct. 28, 2003

(54) METHOD OF WEB CRAWLING UTILIZING CRAWL NUMBERS

(75) Inventors: Dmitriy Meyerzon, Bellevue, WA (US); Sankrant Sanu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/105,758

(22) Filed: Jun. 26, 1998

(51) Int. Cl.$^7$ .................................................. G06F 7/02
(52) U.S. Cl. ........................ 715/513; 707/10; 707/200
(58) Field of Search ........................ 707/4, 501, 513, 707/10, 1, 200; 709/217–218

(56) References Cited

U.S. PATENT DOCUMENTS

| | | | | |
|---|---|---|---|---|
| 5,659,732 A | | 8/1997 | Kirsch | 707/5 |
| 5,748,954 A | | 5/1998 | Mauldin | 707/10 |
| 5,855,020 A | * | 12/1998 | Kirsch | 707/10 |
| 5,870,559 A | * | 2/1999 | Leshem et al. | 709/224 |
| 5,895,470 A | * | 4/1999 | Pirolli et al. | 707/102 |
| 5,898,836 A | * | 4/1999 | Freivald et al. | 709/218 |
| 5,941,944 A | * | 8/1999 | Messerly | 709/203 |
| 5,958,008 A | * | 9/1999 | Pogrebisky et al. | 709/223 |
| 5,974,455 A | * | 10/1999 | Monier | 709/223 |
| 5,978,842 A | * | 11/1999 | Noble et al. | 707/10 |
| 5,987,134 A | * | 11/1999 | Shin et al. | 713/159 |
| 6,003,043 A | * | 12/1999 | Hatakeyama et al. | 707/203 |
| 6,070,176 A | * | 5/2000 | Downs et al. | 345/848 |
| 6,145,003 A | * | 11/2000 | Sanu et al. | 707/3 |
| 6,151,624 A | * | 11/2000 | Teare et al. | 709/217 |
| 6,253,204 B1 | * | 6/2001 | Glass et al. | 707/10 |
| 6,263,049 B1 | * | 7/2001 | Kuhn | 379/265.06 |
| 6,263,364 B1 | * | 7/2001 | Najork et al. | 709/201 |
| 6,351,467 B1 | * | 2/2002 | Dillon | 370/432 |

* cited by examiner

Primary Examiner—Joseph H. Feild
Assistant Examiner—Cesar B. Paula
(74) Attorney, Agent, or Firm—Christensen O'Connor Johnson Kindness PLLC

(57) ABSTRACT

A computer based system and method of retrieving information pertaining to electronic documents on a computer network is disclosed. The method includes maintaining a database that associates each electronic document with a corresponding crawl number that indicates the most recent crawl during which a change to the document was detected. During a subsequent crawl, electronic documents that have changed since the previous crawl are retrieved, and selected data is stored in a database. The retrieved document information is marked with a crawl number. During subsequent searches, crawl numbers are used to determine documents that have changed since a specified crawl.

29 Claims, 13 Drawing Sheets

HISTORY MAP

HISTORY MAP

| URL | TIME STAMP | HASH VALUE | CRAWL NO. CRAWLED | CRAWL NO. MODIFIED |
|---|---|---|---|---|
| | | | | |
| | | | | |
| | | | | |
| | | | | |
| | | | | |
| | | | | |

*Fig.4*

TRANSACTION LOG

| URL | STATUS | ERROR CODE | USER NAME | ENCODED PASSWORD |
|---|---|---|---|---|
|  |  |  |  |  |
|  |  |  |  |  |
|  |  |  |  |  |
|  |  |  |  |  |
|  |  |  |  |  |
|  |  |  |  |  |

*Fig.5*

METHOD OF WEB CRAWLING UTILIZING CRAWL NUMBERS

FIELD OF THE INVENTION

The present invention relates to the field of network information software and, in particular, to methods and systems for retrieving data from network sites.

BACKGROUND OF THE INVENTION

In recent years, there has been a tremendous proliferation of computers connected to a global network known as the Internet. A "client" computer connected to the Internet can download digital information from "server" computers connected to the Internet. Client application software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites located around the world that maintain and distribute electronic documents, A Web site may use one or more Web server computers that store and distribute documents in one of a number of formats including the Hyper Text Markup Language (HTML). An HTML document contains text and metadata or commands providing formatting information. HTML documents also include embedded "links" that reference other data or documents located on any Web server computers. The referenced documents may represent text, graphics, or video in respective formats.

A Web browser is a client application or operating system utility that communicates with server computers via FTP, HTTP, and Gopher protocols. Web browsers receive electronic documents from the network and present them to a user. Internet Explorer, available from Microsoft Corporation, of Redmond, Washington, is an example of a popular Web browser application.

An intranet is a local area network containing Web servers and client computers operating in a manner similar to the World Wide Web described above. Typically, all of the computers on an intranet are contained within a company or organization.

Web crawlers are computer programs that retrieve numerous electronic documents from one or more Web sites. A Web crawler processes the received data, preparing the data to be subsequently processed by other programs. For example, a Web crawler may use the retrieved data to create an index of documents available over the Internet or an intranet. A "search engine" can later use the index to locate electronic documents that satisfy a specified criteria.

A user that performs a document search provides search parameters to limit the number of documents retrieved. For example, a user may submit a search request that includes a list of one or more words, and the search engine locates electronic documents that contain a specified combination of the words. A user may repeat a search after a period of time. When a search is repeated, the user may prefer to avoid locating documents that have been located by prior searches.

It is desirable to have a mechanism by which a user can request a search engine to return only documents that have changed in some substantive way since that prior search. Preferably, such a mechanism will provide a Web crawler with a way to retrieve only documents that may have changed since a previous Web crawl and then to determine if an actual, substantive change has been made to the document. The mechanism would also preferably provide a way to mark the data retrieved from the document and stored in an index with an identifier that could be used in a search of the index to indicate when the Web crawler last found a substantive change to the document. The present invention is directed to providing such a mechanism.

SUMMARY OF THE INVENTION

In accordance with this invention, a system and computer based method of retrieving data from a computer network are provided. In an actual embodiment of the present invention, the method includes performing a Web crawl, by retrieving a set of electronic documents and subsequently retrieving additional electronic documents based on addresses specified within each electronic document. In a later Web crawl, electronic documents that have been modified subsequent to the previous Web crawl and electronic documents that were not retrieved during the previous Web crawl are retrieved. Electronic documents that were deleted since the previous Web crawl are detected. Each Web crawl is assigned a unique current crawl number. A crawl number modified is associated with and stored with the storage data from each electronic document retrieved during the Web crawl. The crawl number modified is set equal to the current crawl number when the document is first retrieved, or when it has previously been retrieved and has been found by the mechanism of the invention to have been modified in some substantive manner. In a subsequent search request, a crawl number can be retained as a search parameter and compared against a crawl number modified that is stored with the document data to determine if a document has been modified subsequent to the crawl number specified in the search.

In accordance with other aspects of this invention, each electronic document has a corresponding document address specification and provides information for locating the electronic document. During a Web crawl, document address specifications are used to retrieve copies of the corresponding electronic documents. Information from each electronic document retrieved during a Web crawl is stored in an index and associated with the corresponding document address specification and with a crawl number modified. If the retrieved document contains document address specifications to linked documents included in hyperlinks, these linked documents are also selectively retrieved during the Web crawl and processed in the manner described above.

In accordance with further aspects of this invention, performing a Web crawl includes assigning a unique current crawl number to the Web crawl, and determining whether a currently retrieved electronic document corresponding to each previously retrieved electronic document copy is substantively equivalent to the corresponding previously retrieved electronic document copy, in order to determine whether the electronic document has been modified since a previous crawl. If the current electronic document is not substantively equivalent to the previously retrieved electronic document copy, and therefore has been modified, the document's associated crawl number modified is set to the current crawl number and stored in the index with the data from the current electronic document.

In accordance with still other aspects of this invention, a secure hash function is used to determine a hash value corresponding to each retrieved electronic document copy. The hash value is stored in the index and used in subsequent Web crawls to determine whether the corresponding electronic document is modified. The current electronic document is retrieved and used to obtain a new hash value, which is compared with the previously determined hash value corresponding to the associated document address specification that is stored in a history map. If the hash values are equal, the current electronic document is considered to be substantively equivalent to the previously retrieved electronic document copy. If the hash values differ, the current electronic document is considered to be modified and the current crawl number is associated with the newly retrieved electronic document as the crawl number modified. The crawl number modified indicates the crawl number of the last crawl in which the data in the document was found to have changed. The hash value is stored with the associated data from the retrieved document and stored in the index. Preferably, hash functions are applied to data from electronic documents after selected data has been filtered out, so that filtered out data is not represented in the hash values, and is therefore not considered in comparisons. For instance, formatting information contained in the retrieved document could be filtered out before the hash value is computed.

In accordance with further aspects of this invention, during an incremental crawl, prior to retrieving an electronic document copy, the time stamp of the current electronic document is compared with the previously stored time stamp of a previously retrieved electronic document corresponding to the current electronic document. If the respective time stamps match, the current electronic document is considered to be substantively equivalent to its corresponding previously retrieved electronic document copy, and is therefore not retrieved during the current incremental crawl. Preferably, the comparison of time stamps is performed by sending a request to a server to transfer the current electronic document if the time stamp associated with the current electronic document is more recent than a time stamp included in the request.

As will be readily appreciated from the foregoing description, a system and method formed in accordance with the invention for retrieving data from electronic documents on a computer network provide an efficient way of retrieving and storing information pertaining to electronic documents, wherein the retrieval of electronic documents that have previously been retrieved is minimized. The invention allows a Web crawler to perform crawls in less time and to perform more comprehensive crawls. Assigning a crawl number modified to a retrieved document that is set to the current crawl number when the document has been retrieved and found to have been modified in some substantive way since the last time it was retrieved by the invention or if it is the first time the document is retrieved advantageously reduces search and document retrieval time.

Storing the crawl number modified with the document data enables a user to perform a subsequent search using a crawl number as a search criteria. This allows a user to search only for documents that have substantively changed since a previous search. For instance, a user could run a first search requesting documents that meet a particular query. The intermediate agent that queries the search engine could retain the crawl number of the most recent crawl made by the web crawler along with recording the search query. A second search performed at a later time could run the same query as the first search, but with the intermediate agent implicitly adding the retained crawl number as a search criteria. The resulting search will only return documents with an associated crawl number modified that is subsequent to the retained crawl number. Because the crawl number modified associated with a document only changes when a subsequent Web crawl finds that it has changed in a substantive way, the second search would only return documents that have actually changed since the first search. The present invention offers other advantages over solely relying on the timestamp of the document to search for new documents. For instance, a search that requests only documents with a timestamp subsequent to the date of a prior search would not return any new documents found by the Web crawler but having timestamps that are earlier than the date of the last search.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein:

FIG. 4 illustrates an exemplary history map in accordance with the present invention;

FIG. 5 illustrates an exemplary transaction log in accordance with the present invention;

DETAILED DESCRIPTION OF THE PREFERRED EMBODIMENT

Figure 1:
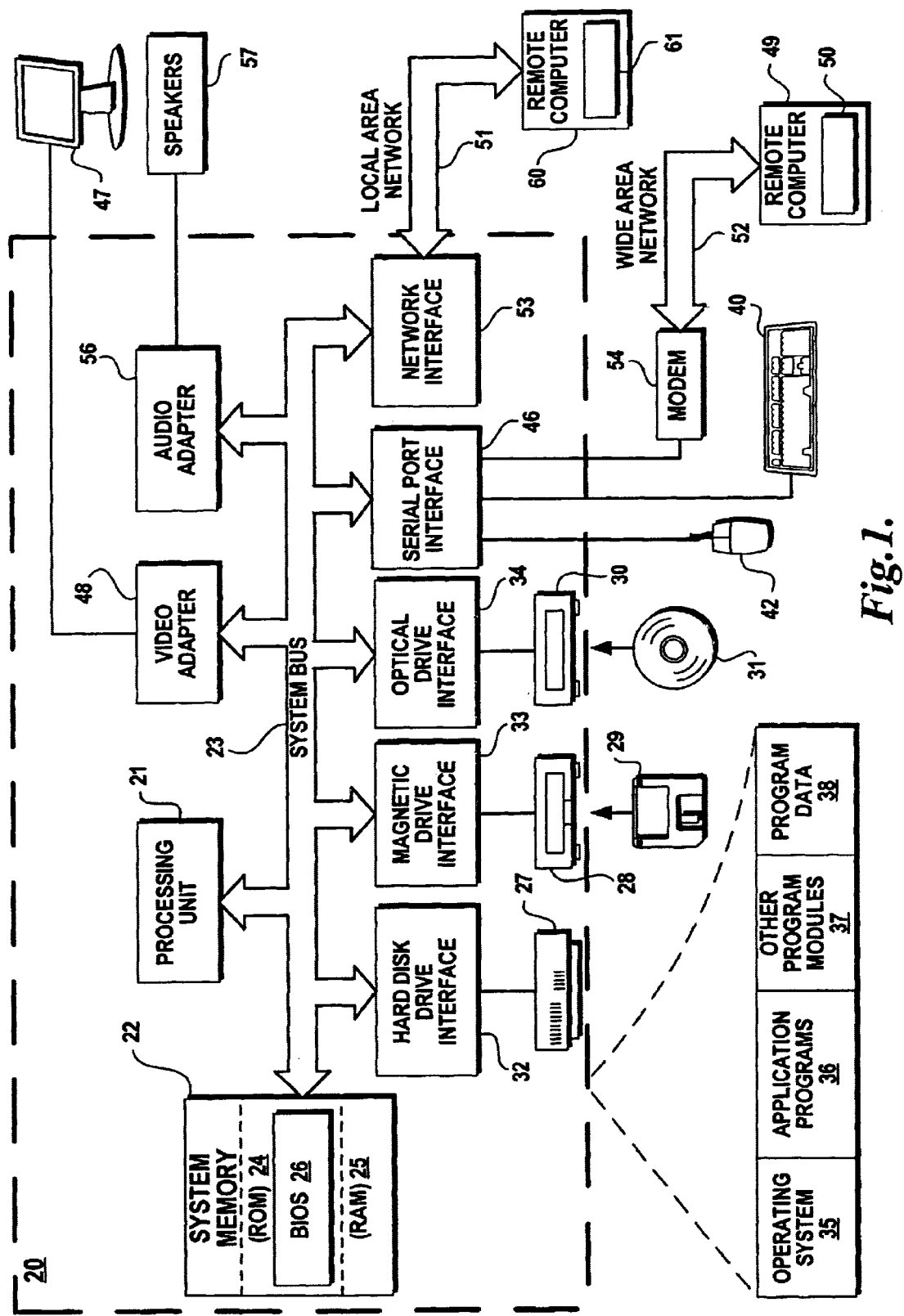
FIG. 1 is a block diagram of a general purpose computer system for implementing the present invention.

The present invention is a mechanism for obtaining information pertaining to electronic documents that reside on one or more server computers. While the following discussion describes an actual embodiment of the invention that crawls the Internet within the World Wide Web, the present invention is not limited to that use. This present invention may also be employed on any type of computer network or individual computer having data stores such as files systems, e-mail messages and databases. The information from all of these different stores can be processed by the invention together or separately.

A server computer is referred to as a Web site, and the process of locating and retrieving digital data from Web sites is referred to as "Web crawling." The mechanism of the invention initially performs an first full crawl wherein a transaction log is "seeded" with one or more document address specifications. Each document listed in the transaction log is retrieved from its Web site and processed. The processing includes extracting the data from each of these retrieved documents and storing that data in an index, or other database, with an associated crawl number modified that is set equal to a unique current crawl number that is associated with the first full crawl. A hash value for the document and the document's time stamp are also stored with the document data in the index. The document URL, its hash value, its time stamp, and its crawl number modified are stored in a persistent history map that is used by the crawler to record the documents that it has crawled.

Subsequent to the first full crawl, the invention can perform any number of full crawls or incremental crawls. During a full crawl, the transaction log is "seeded"with one or more document address specifications, which are used to retrieve the document associated with the address specification. The retrieved documents are recursively processed to find any "linked" document address specifications contained in retrieved document. The document address specification of the linked document is added to the transaction log the first time it is found during the current crawl. The full crawl builds a new index based on the documents that it retrieves based on the "seeds" in its transaction log and the project gathering rules that constrain the search. During the course of the full crawl, the document address specifications of the documents that are retrieved are compared to associated entries in the history map (if there is an entry), and a crawl number modified is assigned as is discussed in detail below.

An incremental crawl retrieves only electronic documents that may have changed since the previous crawl. The incremental crawl uses the existing index and history map and its transaction log is seeded with the document address specifications contained in the history map. In an incremental crawl, a document is retrieved from a Web site if its time stamp is subsequent to the time stamp stored in the Web crawler's history map. During an incremental crawl, a document is preferably only retrieved from a Web site if the time stamp on the document on the Web site is different than the time stamp that was recorded in the history map for that URL. If the time stamp differs, the document is retrieved from the Web server.

During the Web crawls, the invention determines if an actual substantive change has been made to the document. This is done by filtering extraneous data from the document (e.g., formatting information) and then computing a hash value for the retrieved document data. This newly computed hash value is then compared against the hash value stored in the history map. Different hash values indicate that the content of the document has changed, resulting in the crawl number modified stored with the document data being reset to the current crawl number assigned to the Web crawl.

Searches of the database created by the Web crawler can use the crawl number modified as a search parameter if a user is only interested in documents that have changed, or that have been added, since a previous search. Since the invention only changes the crawl number modified associated with the document when it is first retrieved, or when it has been retrieved and found to be modified, the user can search for only modified documents. In response to this request, the intermediate agent implicitly adds a limitation to the search that the search return only documents that Save a crawl number modified that is subsequent to a stored crawl number associated with a prior search.

Web crawler programs execute on a computer, preferably a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during startup, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 operates in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
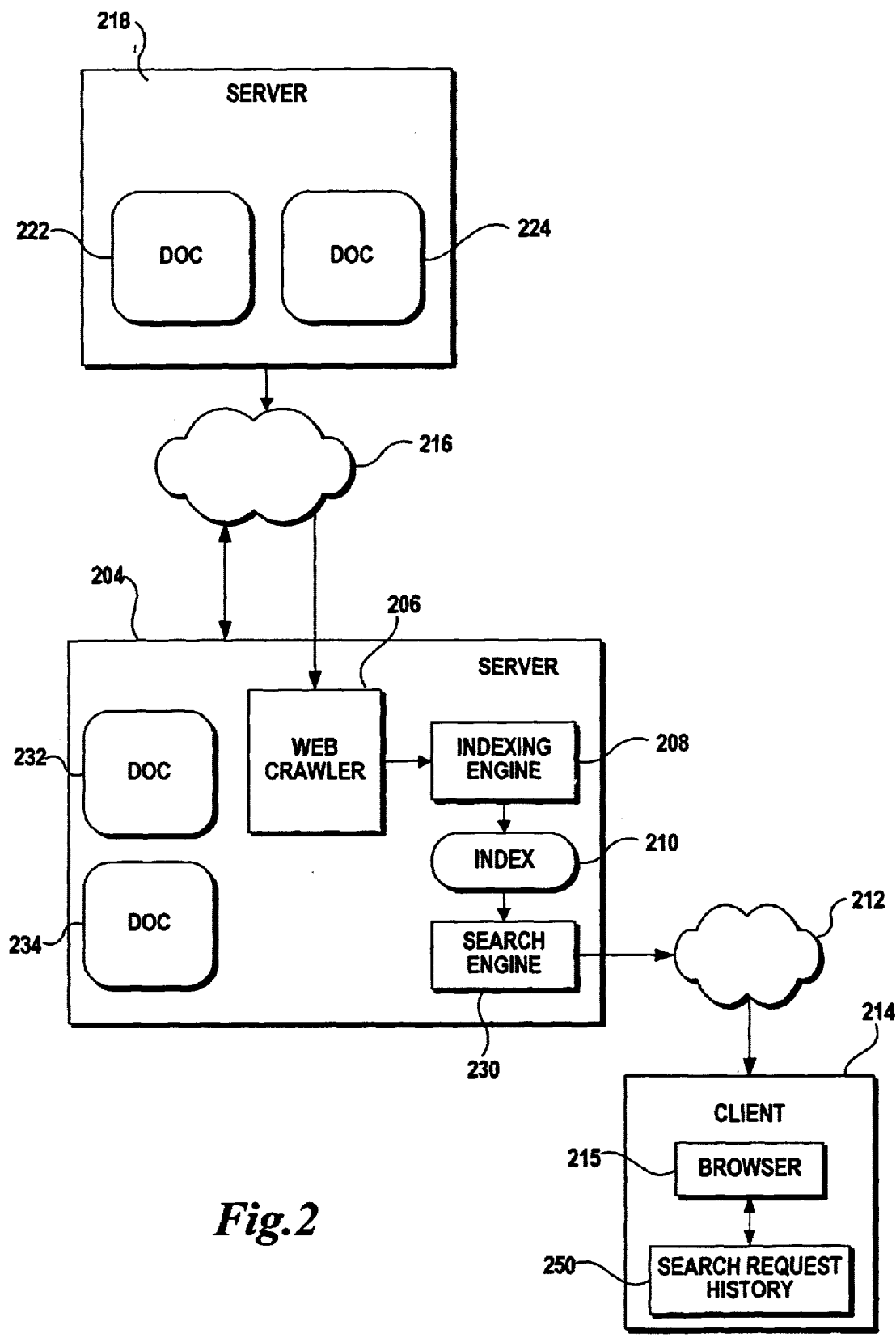
FIG. 2 is a block diagram illustrating a network architecture, in accordance with the present invention.

FIG. 2 illustrates an exemplary architecture of a networked system in which the present invention operates. A server computer 204 includes a Web crawler program 206 executing thereon. The Web crawler program 206 searches for electronic documents distributed on one or more computers connected to a computer network 216, such as the remote server computer 218 depicted in FIG. 2. The computer network 216 may be a local area network 51 (FIG. 1), a wide area network 52, or a combination of networks that allow the server computer 204 to communicate with remote computers, such is the remote server computer 218, either directly or indirectly. The server computer 204 and the remote server computer 218 are preferably similar to the personal computer 20 depicted in FIG. 1 and discussed above.

The Web crawler program 206 searches remote server computers 218 connected to the network 216 for electronic documents 222 and 224. The Web crawler 206 retrieves electronic documents and associated data. The contents of the electronic documents 222 and 224, along with the associated data, can be used in a variety of ways. For example, the Web crawler 206 may pass the information to an indexing engine 208. An indexing engine 208 is a computer program that maintains an index 210 of electronic documents. The index 210 is similar to the index in a book, and contains reference information and pointers to corresponding electronic documents to which the reference information applies. For example, the index may include keywords, and for each keyword a list of addresses. Each address can be used to locate a document that includes the keyword. The index may also include information other than keywords used within the electronic documents. For example, the index 210 may include subject headings or category names, even when the literal subject heading or category name is not included within the electronic document. The type of information stored in the index depends upon the complexity of the indexing engine, which may analyze the contents of the electronic document and store the results of the analysis.

A client computer 214, such as the personal computer 20 (FIG. 1), is connected to the server computer 204 by a computer network 212. The computer network 212 may be a local area network, a wide area network, or a combination of networks. The computer network 212 may be the same network as the computer network 216 or a different network. The client computer 214 includes a computer program, such as a "browser" 215 that locates and displays documents to a user.

When a user at the client computer 214 desires to search for one or more electronic documents, the client computer transmits data to a search engine 230 requesting a search. At that time, the search engine 230 examines its associated index 210 to find documents that may be desired by a user. The search engine 230 may then return a list of documents to the browser 215 at the client computer 214. The user may then examine the list of documents and retrieve one or more desired electronic documents from remote computers such as the remote server computer 218.

As will be readily understood by those skilled in the art of computer network systems, and others, the system illustrated in FIG. 2 is exemplary, and alternative configurations may also be used in accordance with the invention. For example, the server computer 204 itself may include electronic documents 232 and 234 that are accessed by the Web crawler program 206. Also the Web crawler program 206, the indexing engine 208, and the search engine 230 may reside on different computers. Additionally, the Web browser program and the Web crawler program 206 may reside on a single computer. Further, the indexing engine 208 and search engine 230 are not required by the present invention. The Web crawler program 206 may retrieve electronic document information for usages other than providing the information to a search engine. As discussed above, the client computer 214, the server computer 204, and the remote server computer 218 may communicate through any type of communication network or communications medium.

Figure 3:
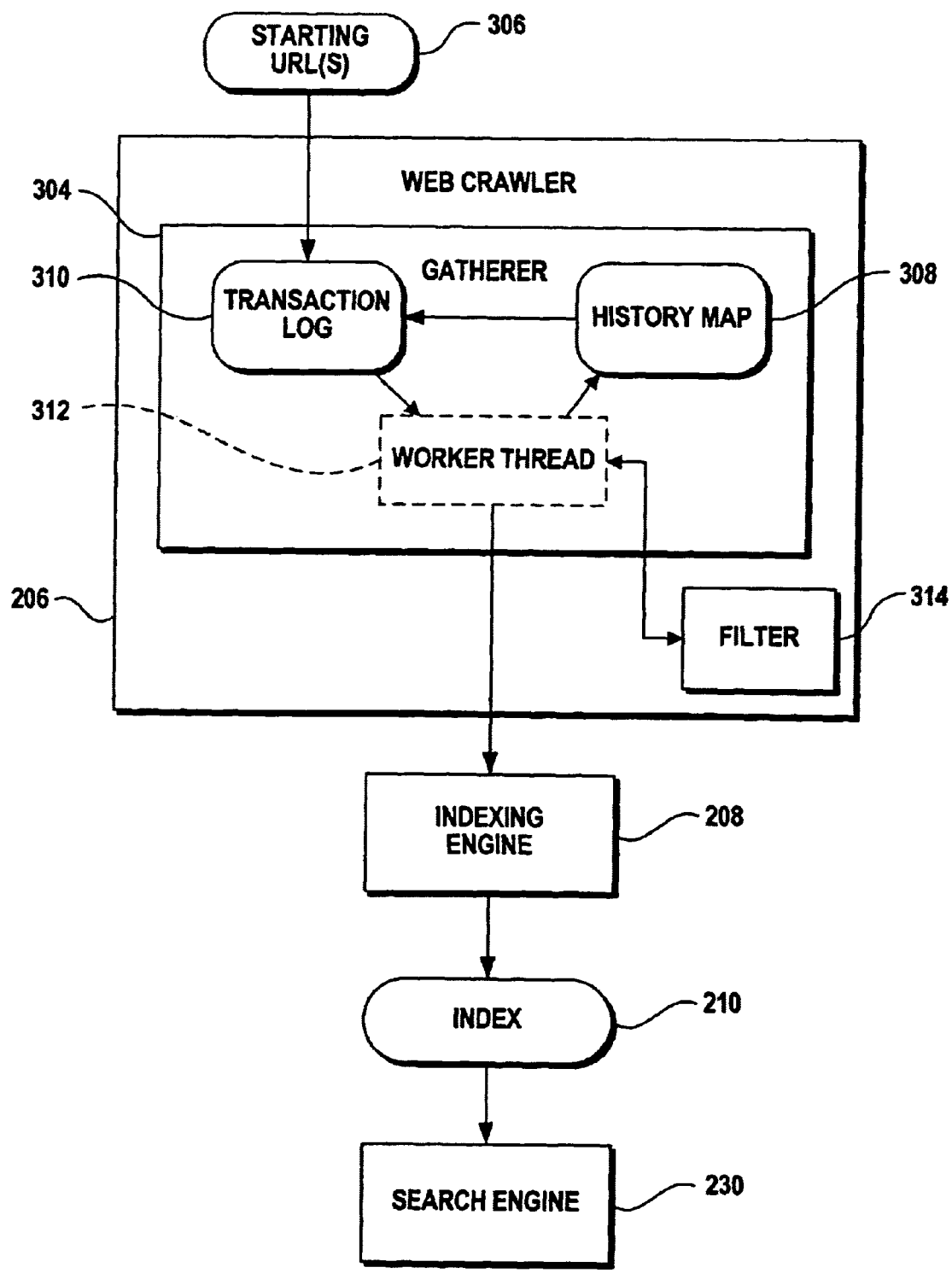
FIG. 3 is a block diagram illustrating some of the components used in the invention.

FIG. 3 illustrates, in further detail, a Web crawler program 206 and related software executing on the server computer 204 (FIG. 2) that performs Web crawling and indexing of information in accordance with the present invention. As illustrated in FIG. 3, the Web crawler program 206 includes a "gatherer" process 304 that performs crawling of the Web and gathering of information pertaining to electronic documents. The gatherer process 304 is invoked by passing it one or more starting document address specifications, i.e., URLs 306. The starting URLs 306 serve as seeds, instructing the gatherer process 304 where to begin its Web crawling process. A starting URL can be a universal naming convention (UNC) directory, a UNC path to a file, or an HTTP path to a URL. The gatherer process 304 inserts the starting URLs 306 into a transaction log 310, which maintains a list of URLs that are currently being processed or have not yet been processed. The transaction log 310 functions as a queue. It is called a log because it is preferably implemented as a persistent queue that is written and kept in a nonvolatile storage device such as a disk to enable recovery after a system failure. Preferably, the transaction queue maintains a small in-memory cache for quick access to the next transactions.

The gatherer process 304 also maintains a history map 308, which contains an ongoing list of all URLs that have been searched during the current Web crawl and previous crawls. The gatherer process 304 includes one or more worker threads 312 that process each URL. The worker thread 312 retrieves a URL from the transaction log 310 and passes the URL to a filter daemon 314. The filter daemon 314 is a process that uses the URL to retrieve the electronic document at the address specified by the URL. The filter daemon 314 uses the access method specified by the URL to retrieve the electronic document. For example, if the access method is HTTP, the filter daemon 314 uses HTTP commands to retrieve the document. If the access method specified is FILE, the filter daemon uses file system commands to retrieve the corresponding documents. The File Transfer Protocol (FTP) is another other well known access method that the filter daemon may use to retrieve a document. Other access protocols may also be used in conjunction with the invention.

After retrieving an electronic document, the filter daemon parses the electronic document and returns a list of text and properties. An HTML document includes a sequence of properties or "tags," each tag containing some information. The information may be text that is to be displayed in the Web browser program 215 (FIG. 2). The information may also be "metadata" that describes the formatting of text. The information within tags may also contain hyperlinks to other electronic documents. A hyperlink includes a specification of a Web address. If the tag containing a hyperlink is an image, the Web browser program 215 uses the hyperlink to retrieve the image and render it on the Web page. Similarly, the hyperlink may specify the address of audio data. If a hyperlink points to audio data, the Web browser program retrieves the audio data and plays it.

An "anchor" tag specifies a visual element and a hyperlink. The visual element may be text or a hyperlink to an image. When a user selects an anchor having an associated hyperlink in a Web browser program 215, the Web browser program automatically retrieves an electronic document at the address specified in the hyperlink.

Tags may also contain information intended for a search engine. For example, a tag may include a subject or category within which the electronic document falls, to assist search engines that perform searches by subject or category. The information contained in tags is referred to as "properties" of the electronic document. A electronic document is therefore considered to be made up of a set of properties and text. The filter daemon 314 returns the list of properties and text within an electronic document to the worker thread 312.

As discussed above, an electronic document may contain one or more hyperlinks. Therefore, the list of properties includes a list of URLs that are included in hyperlinks within the electronic document. The worker thread 312 passes this list of URLs to the history map 308. When a new or modified electronic document is retrieved, the history map 308 checks each hyperlink URL to determine if it is already listed within the history map. URLs that are not already listed are added to the history map and are marked as not having been crawled during the current crawl. They are also added to the transaction log 310, to be subsequently processed by a worker thread. As discussed below, a history map includes crawl number crawled data and crawl number modified data. The crawl number crawled data indicates the most recent crawl number during which the URL was processed. The crawl number modified data indicates the most recent crawl number during which a modified electronic document was retrieved. Use of the history map 308 works to prevent the same URL from being processed more than once during a crawl.

The worker thread 312 then passes the list of properties and text to the indexing engine 208. The indexing engine 208 creates an index 210, which is used by the search engine 230 in subsequent searches.

FIG. 4 illustrates an exemplary history map 308 in accordance with the present invention. Preferably, the history map 308 is stored in a nonvolatile memory so that it is persistent across multiple crawls and system shutdowns. As depicted, the history map 308 includes multiple entries 410, one entry corresponding to each URL 412. The history map entries 410 include URL data 412 specifying the addresses of electronic documents and time stamp data 414 corresponding to each electronic document. The time stamp data 414 specifies the time stamp of the corresponding electronic document at the most recent time that the Web crawler retrieved the electronic document. A history map entry 410 also includes hash value data 416 and crawl number crawled data 418. The crawl number crawled data 418 specifies the most recent crawl during which the corresponding URL was processed. As discussed below, the crawl number crawled data 418 prevents duplicate processing of URLs during a crawl, and allows a crawl to be completed. When a crawl is completed, the crawl number crawled data 418 corresponding to each entry in the history map 308 is equal to the current crawl number, unless the crawler did not find a link to the corresponding document.

The history map 410 also includes crawl number modified data 420. A crawl number modified data 420 specifies the most recent crawl number during which the corresponding electronic document was determined to be modified. In contrast, the crawl number crawled data 418 specifies the most recent crawl number in which the document was processed. The crawl number crawled data 418 is set to the current crawl number each time the document is processed. The crawl number modified 420 is only set to the current crawl number when the document is found to have changed. The use of crawl numbers is explained in further detail below.

As noted above, the history map entry 410 also includes hash value data 416. The hash value data 416 specifies a hash value corresponding to the electronic document specified by the URL 412. A hash value results from applying a "hash function" to the electronic document. A hash function is a mathematical algorithm that transforms a digital document into a smaller representation of the document. The smaller representation of the document is the hash value corresponding to the document. A "secure hash function" is a hash function that is designed so that it is computationally unfeasible to find two different documents that "hash" to produce identical hash values. A hash value produced by a secure hash function serves as a "digital fingerprint" of the document. If two separately produced hash values are equivalent, one can be certain to a very high degree of probability that the documents used to produce the respective hash functions are exactly the same. Similarly, if two hash values are not the same, the corresponding documents are not exactly the same. As discussed in further detail below, the mechanism of the invention saves a hash value corresponding to an electronic document, and compares the stored hash value with a new hash value computed from a newly retrieved document, in order to determine whether the documents are equivalent, and therefore whether the electronic document has changed. In one actual embodiment of the invention, a secure hash function known as "MD5" is used to create hash values. The MD5 secure hash function is published by RSA Laboratories of Redwood City, Calif., in a document entitled RFC 1321.

An exemplary transaction log 310 is shown in FIG. 5. The transaction log 310 contains a plurality of entries 510 that each represent a document to visit during the Web crawl. In an actual embodiment of the invention, each entry 510 in the transaction log contains the URL of the document to be processed, a status data 514 that is marked when the entry 510 is processed, an error code data 516 that indicates any errors encountered during processing, a user name data 518 and a encoded password data 520. The user name data 518 and the encoded password data 520 can be used during processing to access secure Web sites. One skilled in the art will appreciate that additional fields can be added to the data entries 410 and 510, as may be required by the particular application of the invention.

The broad "types" of Web crawls performed by the present invention can be conveniently described as a "first full crawl" (FIG. 6), the creates and fills both an instance of the index 210 and an instance of the history map 308, a "full crawl"(FIG. 10) that fills a new instance of the index 210 while using the existing history map 308, and an "incremental crawl" (FIG. 11) that updates the existing index 210 as it revisits the URLs contained in the existing history map 308 and checks for changes to the documents. Once initialized as a first full crawl, a full crawl, or an incremental crawl, the method and system of the Web crawl described in FIGS. 7–9 is essentially the same for all types of Web crawls performed by the invention.

Figure 6:
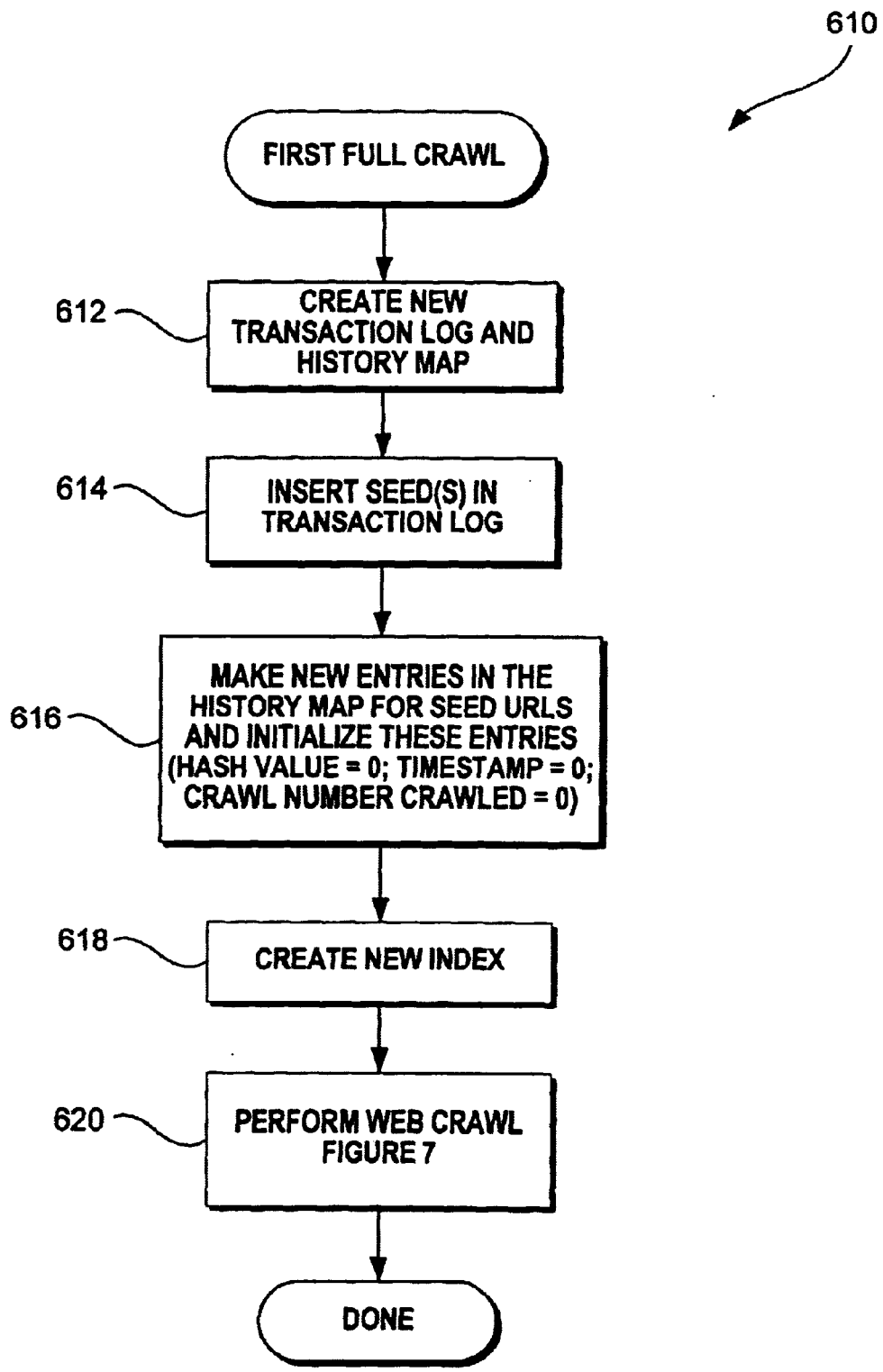
FIG. 6 is a flow diagram illustrating the process of performing a first full crawl.

The first full crawl 610 is shown in FIG. 6. In a step 612, the gatherer 304 creates a new transaction log 310 and a new history map 308, neither of which have any preexisting entries 410 or 510. The transaction log is then loaded with one or more entries 510 containing "seed" URLs 512 in a step 614. The inserted URLs 512 are referred to as "seeds" because they act as starting points for the Web crawl. During the Web crawl, the Web crawler 206 will recursively gather and visit the URLs that are referenced in documents that the Web crawler 206 gathers (FIG. 9). As is know to those skilled in the art, web crawls may also be limited to specific crawl parameters that define, for instance, the type of web documents to be crawled.

In a step 616, corresponding entries 410 are made in the history map 308 for each of the seed entries 510 made in the transaction log 310. The history map entries 410 are initialized so that the time stamp data 414, the hash value data 416, the crawl number crawled data 418 and the crawl number modified filed 420 are all set equal to zero or an equivalent "empty" or "null" value. These initialized values 414, 416, 418 and 420 will influence the way in which the entry 510 will be processed in the Web crawl in FIGS. 7–9. A new index 210 is created in a step 618 and the Web crawl is performed in a step 620.

Figure 7:
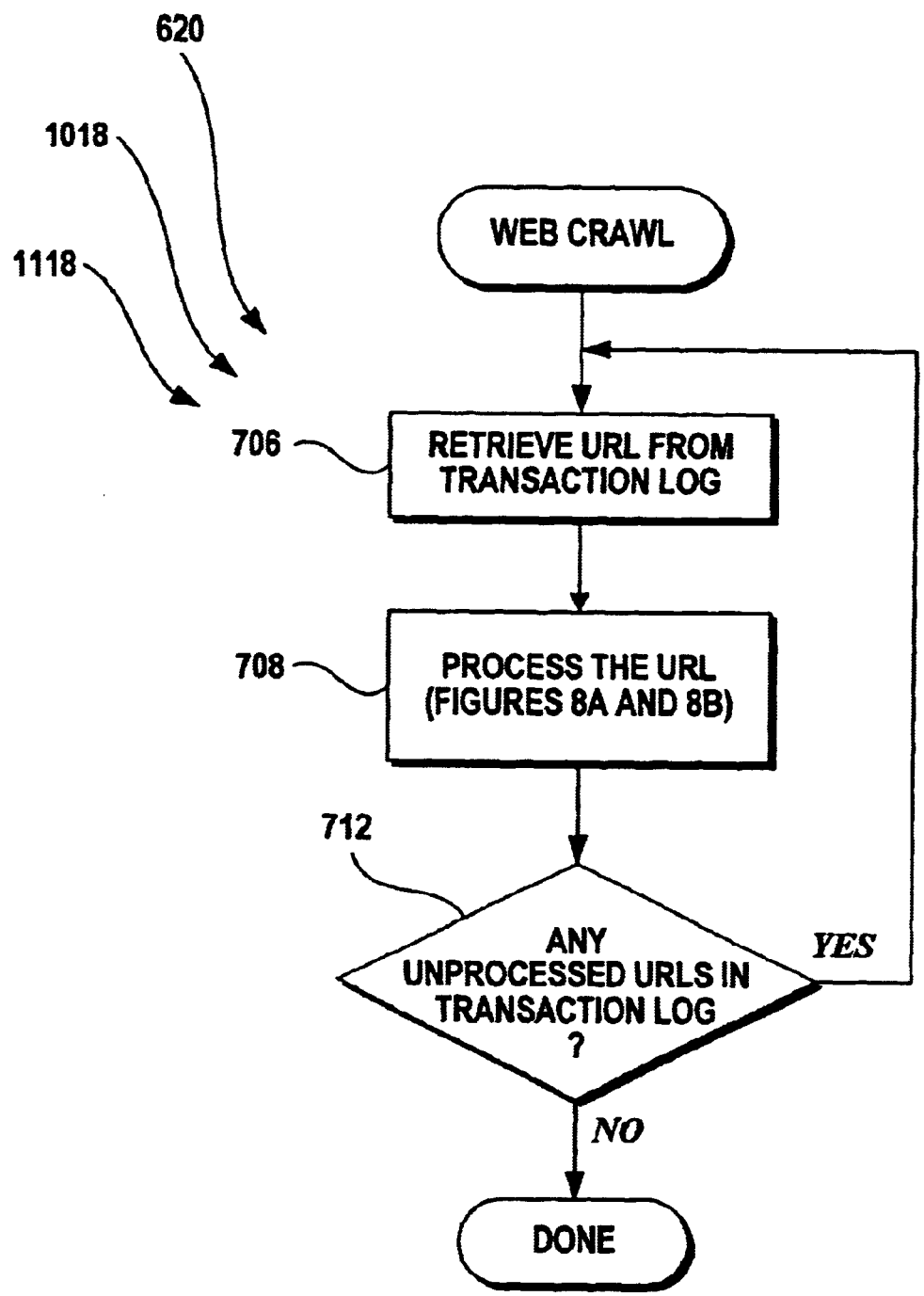
FIG. 7 is a flow diagram illustrating the process of performing a Web crawl.

The Web crawl performed in the step 620 is illustrated in FIG. 7. At a step 706, the Web crawler 206 begins a loop of retrieving and processing URLs from the transaction log 310. Specifically, at the step 706, a worker thread 312 retrieves a URL 512 from an unprocessed entry 510 in the transaction log 310 and passes the URL to the processing illustrated in FIGS. 8a and 8b at a step 708. Each entry 510 in the transaction log 310 is processed in this manner until it is detected in a decision step 712 that all the entries 510 in the transaction log 310 have been processed.

Although the process 620 is discussed herein with reference to a single worker thread 312, preferably the mechanism of the invention includes multiple worker threads 312, each worker thread, in conjunction with other components, performing the Web crawl illustrated in FIGS. 7–9. Each worker thread retrieves a URL from the transaction log (step 706), processes the URL as described above (step 708), and then continues to retrieve and process URLs until there are none left in the transaction log (step 712). The number of worker threads may depend upon the configuration and available resources of the computer system.

Figure 8A:
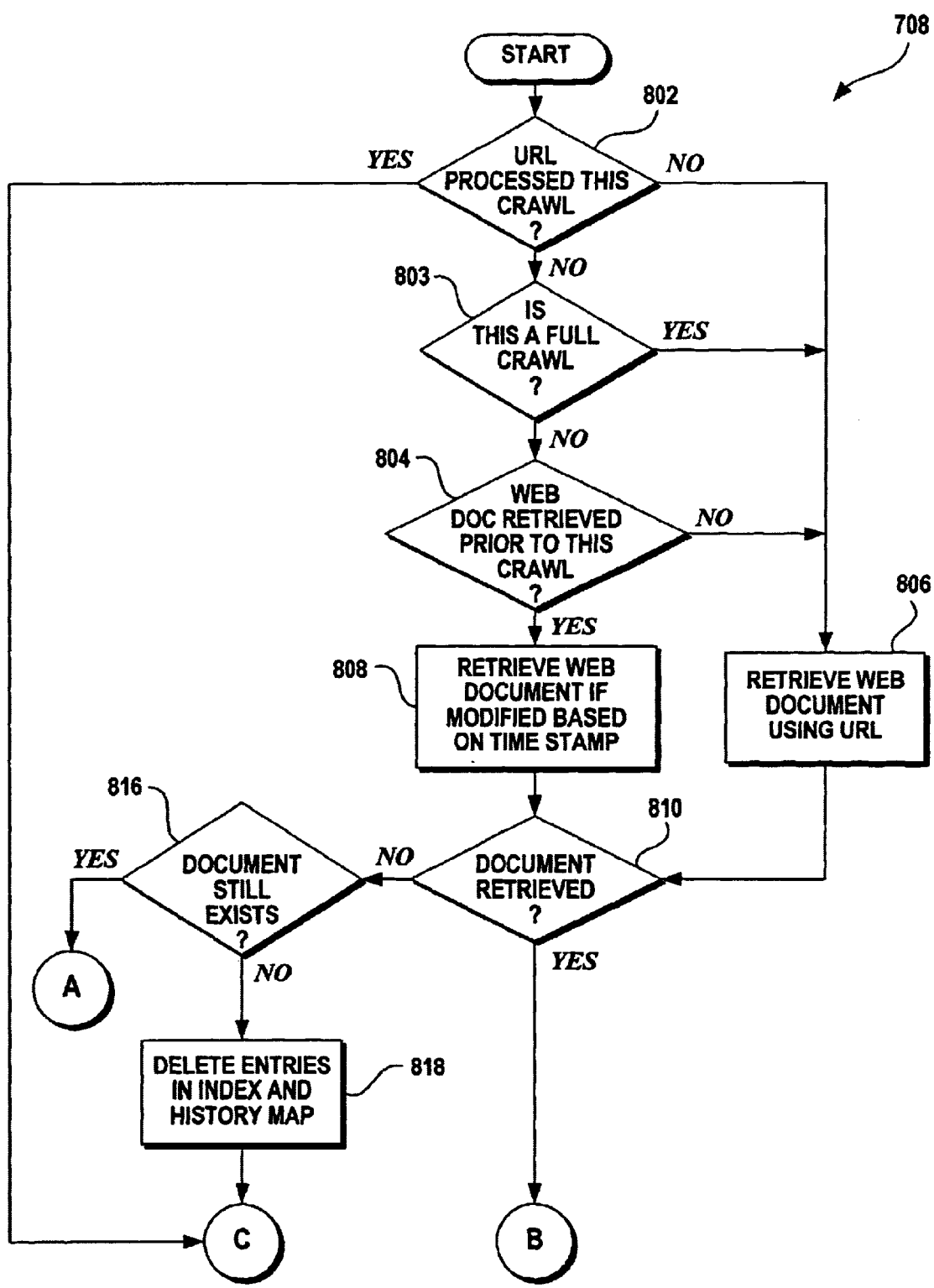
FIGS. 8a and 8b are flow diagrams illustrating the processing of URLs, in accordance with the invention.
Figure 8B:
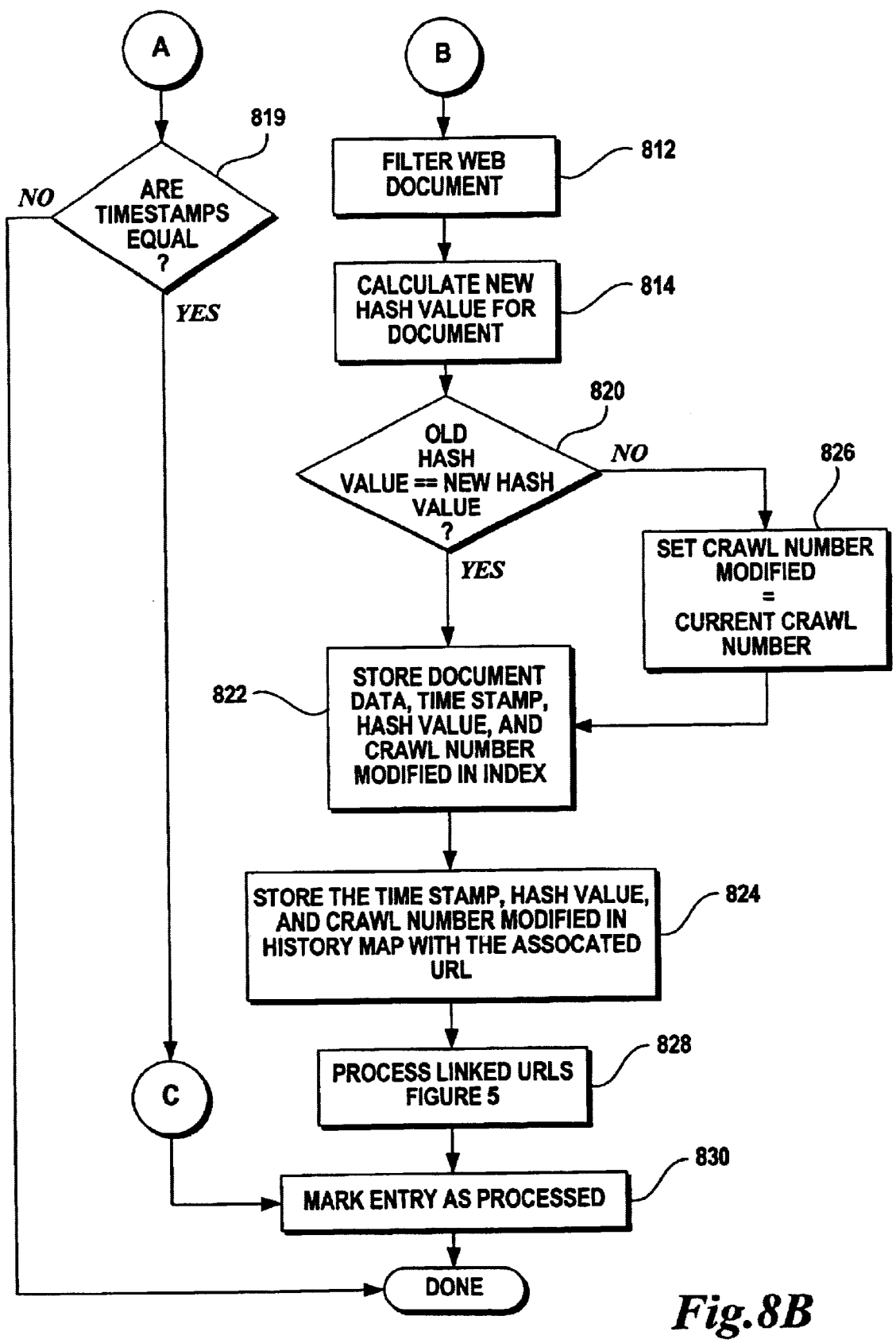
Figure 9:
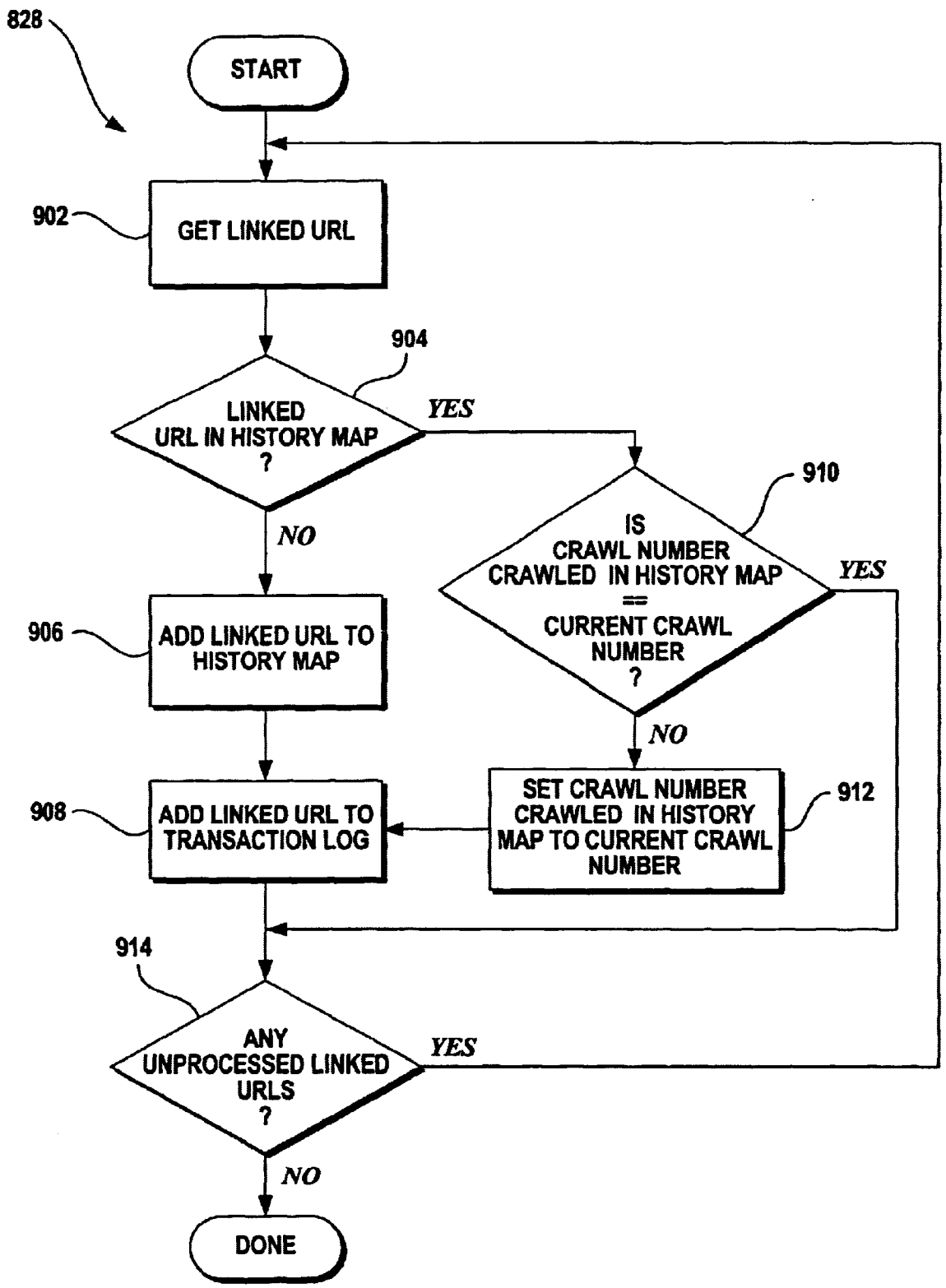
FIG. 9 is a flow diagram illustrating the processing during a Web crawl of URLs that are linked in an electronic document.

FIGS. 8a and 8b illustrate the step 708 of processing a URL retrieved from the transaction log 310 during a first full crawl. FIGS. 8a and 8b will also be discussed below to with reference to the full crawl (FIG. 10) and the incremental crawl (FIG. 11). At a step 802, a determination is made of whether the URL 512 has been processed during the current crawl by checking the history map crawl number crawled data 418 for the current crawl number. If the crawl number crawled 418 corresponding to the URL matches the current crawl number, the URL has been processed during the current crawl. If the crawl number crawled 418 does not match the current crawl number, or if the history map 308 does not contain an entry for the URL, the URL has not been processed during the current crawl. If the URL has been crawled during the current crawl, the process 708 is complete for the URL.

Documents 222, 224 may be retrieved under the system and method of the present invention either conditionally or unconditionally. A first full crawl and a full crawl retrieve the documents 222, 224 unconditionally, while an incremental crawl retrieves documents conditionally base on a comparison of time stamps. This is discussed in detail below with reference to FIG. 11. In the first full crawl, the decision step 803 passes control to a step 806 where the URL is unconditionally retrieved. Decision step 803 is illustrated for the convenience of showing that the documents in the transaction log 310 are unconditionally retrieved during the first full crawl. The document is unconditionally retrieved in the step 806 when the decision step 804 determines that the URL 512 has not been previously retrieved (e.g., because there is no entry 410 for the URL in the history map 308 or the entry in the history map 308 has a zero value in the crawl number crawled data 418). If the retrieval of the document is successful in the step 808, the decision block 810 passes control to a step 812 (FIG. 8b).

At step 812 (FIG. 8B), the filter daemon 314 filters the new electronic document. The worker thread 312 then calculates a hash value from the filtered data received from the filter daemon 314 at a step 814. As discussed above, the worker thread preferably uses a secure hash function, such as MD5, to calculate the hash value. At a step 820 (FIG. 8b), the hash value 416 of the previously retrieved corresponding electronic document 410 is compared with the new hash value calculated at the step 814 and a determination is made of whether the hash values are equal. Equal hash values indicate that the filtered data corresponding to the newly retrieved electronic document is the same as the filtered data corresponding to the previously retrieved version of the electronic document. Because this is a first full crawl and the hash value was initialized to zero, the decision block 820 will determine that the hash values are not equal. Since the hash values are not equal, the crawl number modified 420 in the history map 308 is set to be the current crawl number in a step 826. The document information is then stored in the index 210 in step 822. The entry 410 in the history map 308 associated with the URL 412 is updated in a step 824 with the new hash value 416 (calculated in step 814), the document time stamp 414 (retrieved with the document), and the crawl number modified 420 (set in the step 826).

At a step 828, the URLs that are included as hyperlinks in the newly retrieved electronic document are processed. The processing of the linked URLs at the step 828 is illustrated in FIG. 9 and discussed below. In a block 830, the status data 514 for the entry 510 being processed is marked as completed. Besides being used in the step 712 to determine if all the entries 510 have been processed, marking the entries 510 as they are completed assists in a recovery from a system failure by allowing the crawler to continue the crawl from where it left off. This is possible because the transaction log 310 is persistently stored on a storage medium (e.g., 27, 28 or 30) and updated as the crawl proceeds. After step 830, the processing of the URL is finished, and control returns to decision block 712 in FIG. 7, where the processing of the next URL begins.

FIG. 9 illustrates the processing of the linked URLs (step 722) contained within an electronic document 222, 224. At a step 902, a linked URL is retrieved from the filtered data passed back from the filter daemon 314. At a step 904, a determination is made of whether the history map 308 contains the linked URL. If the history map does not contain the linked URL, at a step 906, the linked URL is added to the history map 308 and the entry 410 is initialized as discussed above. The linked URL is also added to the transaction log 310 at a step 908.

If, at the step 904, it is determined that the history map 308 contains the linked URL, then at a step 910, a determination is made of whether the crawl number crawled in the history map 308 associated with that URL is set to the current crawl number. A negative determination indicates that the linked URL has not yet been processed during the current crawl and the crawl number crawled is set to the current crawl number in a step 912 and the URL is added to the transaction log 310 in the step 908. If the crawl number crawled 318 is equal to the current crawl number, the URL has already been added to the transaction log 310 and the step 908 is skipped and the processing proceeds to step 914. This prevents the same URL from being added to the transaction log 310 more than once during the same Web crawl.

Processing continues in step 914 after step 908 or step 910. At step 914, a determination is made of whether there are any additional linked URLs in the filtered data. If any additional linked URLs exist, processing returns to step 902, to begin the retrieval and processing of the next linked URL. If, at step 914, there are no more linked URLs to process, the processing 722 of the linked URLs within the filtered data corresponding to an electronic document is complete.

Figure 10:
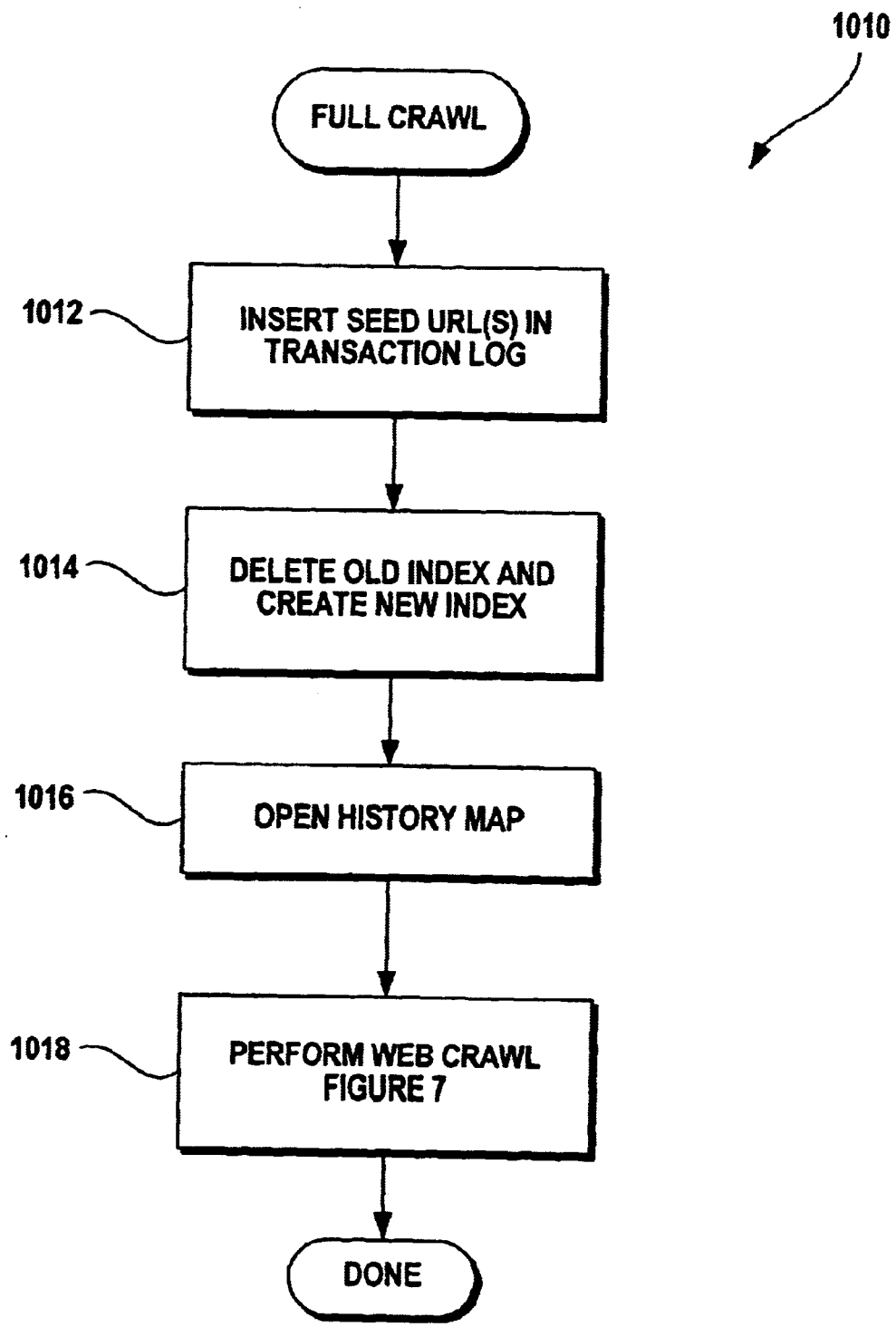
FIG. 10 is a flow diagram illustrating the process of performing a full crawl, in accordance with the invention.
Figure 11:
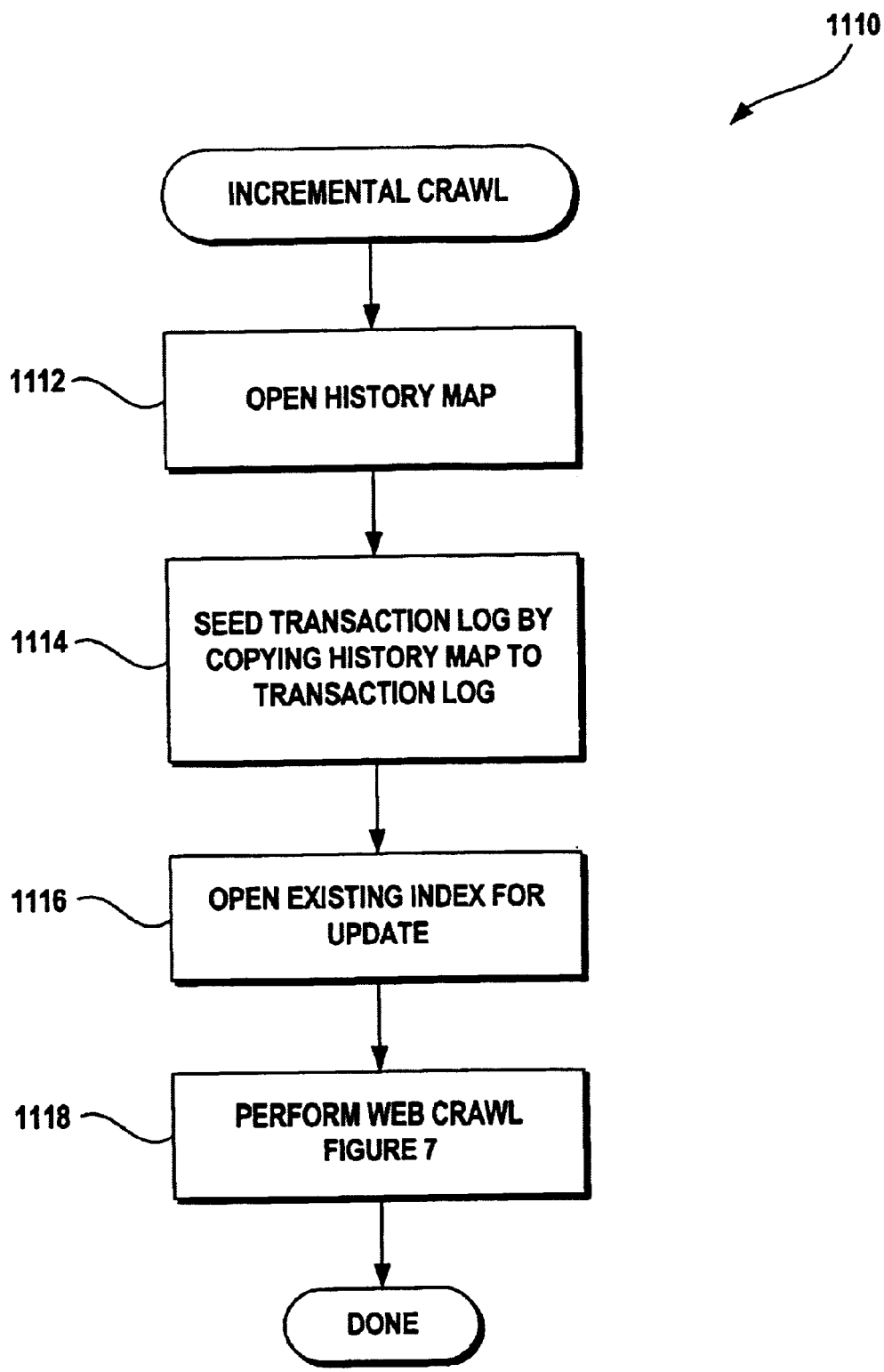
FIG. 11 is a flow diagram illustrating the process of performing an incremental crawl, in accordance with the invention.

A "full crawl" 1010 is illustrated in FIG. 10. The full crawl begins at a step 1012 by inserting one or more seed URLs 512 into entries 510 in the transaction log 310. The full crawl creates a new index 210 each time it runs at a step 1014. Unlike the first full crawl (FIG. 6), which is discussed above, the full crawl 1010 opens an existing history map 308 in a step 10 16 which it uses during the processing of the entries in the transaction log 310 (FIGS. 8a, 8b, and 9). In a step 1018, the Web crawl is performed in substantially the same manner as that illustrated in FIG. 7, which is discussed above.

Returning to FIGS. 8a and 8b to illustrate the processing of the URLs (step 708) during the full web crawl, the steps illustrated in FIG. 8a and steps 812 and 814 shown in FIG. 8b are performed during the full crawl in substantially the same manner as is discussed above for the first full crawl (FIG. 6). The unsuccessful retrieval of a document is detected in the decision block 810. At a step 816 a determination is made of whether the document still exists. If the document no longer exists, at a step 818, entries 410 pertaining to the document are deleted from the history map 308 and the index 210. The entry 510 is then marked as completed in a block 830. An error code 516 can also be inserted into the error code filed 516.

If a determination cannot be made at the step 816, the process 708 is complete for the URL and the entry 510 is not marked as complete. This may occur, for example, if communication with a server cannot be established. The processing of this URL is complete following the step 819. Because the entry 510 for this URL is not marked as complete, the URL may be retrieved by tile worker thread 312 at a later time in the processing of the URLs in the transaction log. The number of retrieval attempts for any given URL can be limited to a predetermined number. After this predetermined number is reached, the entry 510 is marked as complete and error code is inserted in the error code data 516. The process described in steps 810, 816, 818 and 819 is performed in substantially the same manner for all types of Web crawls performed by the invention.

If the document is successfully retrieved, the document is retrieved and filtered in the step 812 and the hash value of the document is computed in the step 814. At a step 820, the hash value 416 computed the last time the document was retrieved is compared with the new hash value calculated at the step 814 and a determination is made of whether the hash values are equal. Equal hash values indicate that the filtered data corresponding to the newly retrieved electronic document is the same as the filtered data corresponding to the previously retrieved version of the electronic document. In one actual embodiment of the invention, at a step 824, even if the hash values are equal, data from the electronic document is indexed along with the newly computed hash value and document time stamp. If the document was unchanged, as indicated by the new hash value (from step 814) being the same as the hash value 416 stored in the history map 308, the previous value of the crawl number modified 420 (stored in the history map 308) is added to the index, along with the filtered data, hash value, and document time stamp at a step 822. The electronic document may therefore have a time stamp that is more recent than its crawl number modified, for example, if the time stamp has changed but the filtered data is unchanged.

A determination at step 820 that the new hash value does not equal the old hash value 416 indicates that the filter data corresponding to the newly retrieved electronic document is different from the filter data corresponding to the previously retrieved version of the electronic document. If the hash values are not equal, the crawl number modified 420 in the history map 308 is set to be the current crawl number in a step 826. This change made to the crawl number modified 420 indicates that the document was found to have changed in a substantive way. The document information is then stored in the index 210 in step 822, as described above, but the crawl number modified that is stored with the data has been set to the current crawl number in step 826. The entry 410 associated with the URL in history map 308 is updated in a step 824 with the new hash value 416, the document time stamp 414, and the crawl number modified 420. At a step 828, the URLs that are included as hyperlinks in the newly retrieved electronic document are processed as discussed above with reference to FIG. 9. The entry 510 is then marked as processed in the block 830.

FIG. 11 illustrates a process 1110 of performing an "incremental crawl"in accordance with the present invention. An incremental crawl is performed subsequent to a full crawl or an incremental crawl, for the purpose of retrieving new documents or documents that have been modified since the previous crawl. The incremental crawl uses an existing history map 310 that is opened in a step 1112. At a step 1114, the transaction log 310 is "seeded" by copying all of the history map entries 410 into the transaction log as entries 510. The history map 308 is updated during the crawl and saved between crawls. Therefore, the history map 308 contains the URLs corresponding to all electronic documents retrieved in the previous full and incremental crawls except for those deleted as described above. Copying the entire history map 308 to the transaction log 310 is a way of instructing the worker threads 312 to process URLs corresponding to electronic documents that have previously been retrieved.

A purpose of the incremental crawl 1110 is to update the existing index 210, which is opened for update it a step 1116. The Web crawl illustrated in FIG. 7 is then performed in substantially the same manner as is described above. Referring to FIGS. 8a and 8b to discuss the processing of the URLs (step 708) in an incremental crawl, the incremental crawl differs from the first full crawl and the full crawl in that it can conditionally retrieve documents based on time stamps as illustrated in steps 803, 804 and 808 of FIG. 8. The remaining steps shown in FIGS. 8a and 8b are performed in substantially the same manner as is discussed above with reference to the first full crawl (FIG. 6) and the full crawl (FIG. 10). Since this is an incremental crawl 1110, the decision block 803 directs the program control to a step 804. At a step 804, a determination is made of whether the electronic document corresponding to the URL has been retrieved prior to the current crawl. If the history map 308 does not contain an entry for the URL, the corresponding electronic document has not been retrieved prior to the current crawl and is unconditionally retrieved in the step 806.

If at step 804 it is determined that the electronic document corresponding to the URL 512 has been retrieved prior to the current crawl, at a step 808 the worker thread passes the URL 512 and its associated time stamp 414 to the filter daemon 314, which conditionally retrieves the electronic document corresponding to the URL 412. In particular, the retrieval of the electronic document is conditional upon an indication that the electronic document has been modified, based upon a saved time stamp 414 of the electronic document. As discussed above, the history map 308 is persistent across crawls and system shutdowns. A history map entry 410 (FIG. 4) includes a time stamp 414 of the electronic document. When an electronic document is retrieved using the HTTP protocol, the Web server passes the electronic document with a time stamp that indicates the most recent time at which the electronic document has been modified. When a history map entry 410 is created, the time stamp is stored in the entry 414.

In one actual embodiment of the invention, at step 808, when the electronic document is retrieved using the HTTP protocol, an HTTP "Get If-Modified-Since" command is sent from the Web crawler 206 to the Web server addressed by the URL. This command includes a specification of a time stamp. The Web server receiving this command compares the received time stamp with the time stamp of the corresponding electronic document on the Web server. The Web server transmits the corresponding electronic document to the Web crawler only if a comparison of the time stamps indicates that the electronic document has been updated since the date and time specified by the received time stamp.

Similarly, when the FILE protocol is used to retrieve an electronic document, file system attributes are used to determine whether the electronic document has a file date more recent than the time stamp stored in the history map. A similar determination is made when other protocols are used to retrieve an electronic document.

At a step 810, the worker thread 312 determines whether an electronic document is received at the step 808. If a document is not retrieved, at a step 816 a determination is made of whether the document still exists. If the document no longer exists, at a step 818, entries pertaining to the document are deleted from the index 210 and the history map 308. If the document still exists, but has not been retrieved because the time stamp is unchanged, this is detected in decision step 819 and the entry 510 is marked as complete in the step 830. If a determination cannot be made at the step 816, the process 708 is complete for the URL. This may occur, for example, if communication with a server cannot be established. Because the entry 510 for this URL is not marked as complete, the worker thread can attempt to retrieve the URL again later, subject to the predefined limits discussed above.

A determination at step 810 that a new document has been retrieved indicates that the new electronic document has a time stamp more recent then the stored time stamp of the previous version of the electronic document. Some Web servers do not support the HTTP "Get If-Modified-Since" command, and always transfer an electronic document in response to this command. Therefore, receiving a new electronic document at step 808 and determining that a new electronic document is retrieved at step 810 does not guarantee that the retrieved document has a more recent time stamp. However, processing continues at a step 812, under the assumption that the newly retrieved electronic document may have a more recent time stamp.

The remaining steps illustrated in FIG. 8a, 8b, and 9 are performed during the incremental crawl 1110 in substantially the same manner as is discussed above with reference to the first full crawl (FIG. 6) and the full crawl (FIG. 10).

Figure 12:
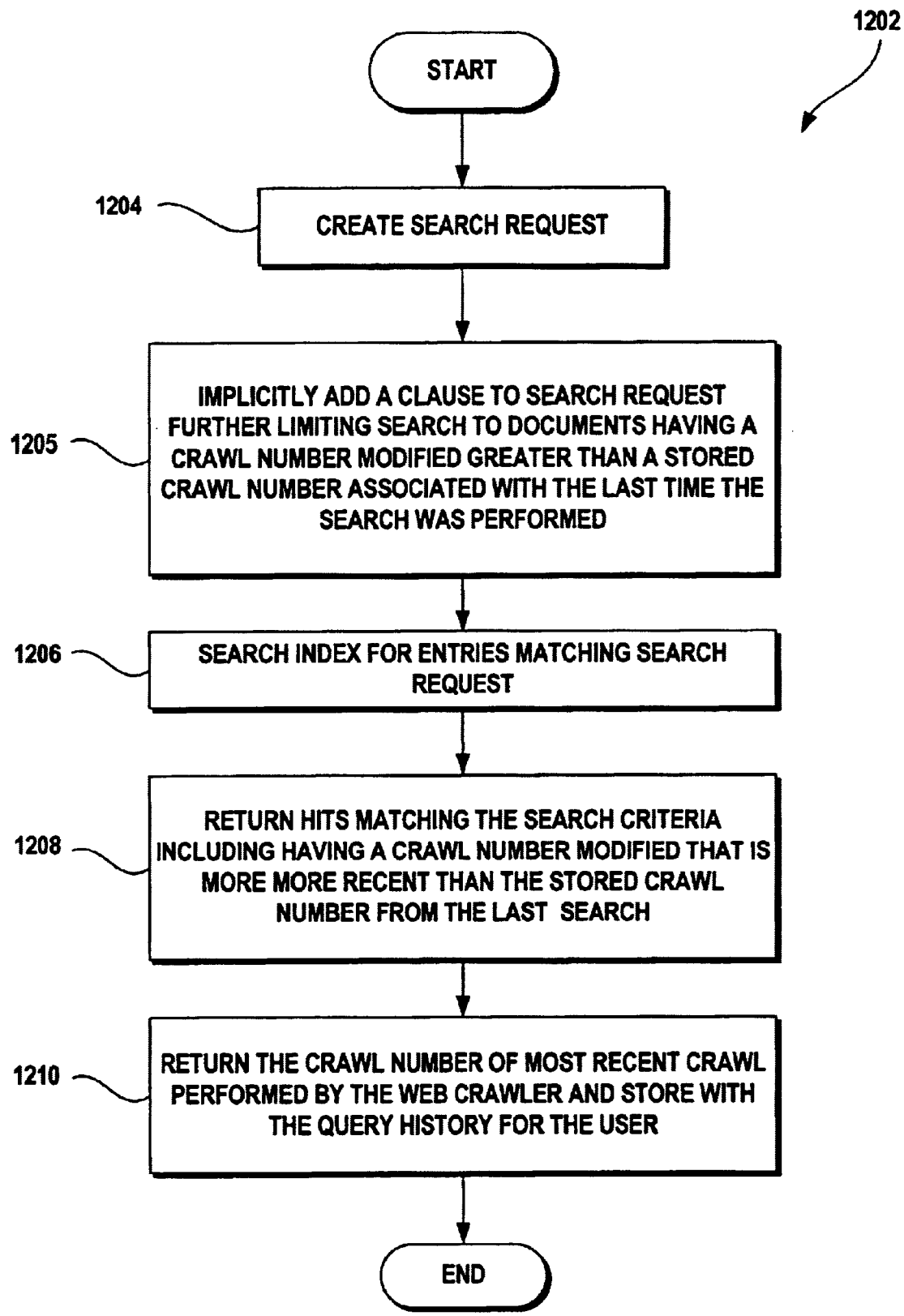
FIG. 12 is a flow diagram illustrating the process of performing a search for electronic documents, in accordance with the present invention.

FIG. 12 illustrates an exemplary process 1202 of handling a Web search request in accordance with the present invention. At a step 1204, a search engine 230 (FIG. 2) receives a search request from a client application such as the web browser 215. If the user wishes to receive only those documents that have changed in some substantive way since the last time the search request was run, the Web browser 215 (or other server or client application) sending the search request implicitly adds a clause to the search request that limits the search to only return those documents that have a crawl number modified that is greater than a stored crawl number associated with the last time the search request was processed by the search engine 230 (step 1205). The stored crawl number is retained in a search request history 250 (FIG. 2) and represents the crawl number of the most recent crawl that preceded the last time that the search request was processed.

At a step 1206, the search engine 230 searches the index 210 for entries matching the specified criteria. The search engine 230 returns to the client computer 214 search results that include zero, one, or more "hits" at a step 1208. Each hit corresponds to an electronic document that matches the search criteria. A "match" includes having a crawl number modified that is more recent than the stored crawl number specified in the search request. After the search is performed, at a step 1210, the client application 215 implicitly asks the search engine 230 to return the crawl number of the most recently performed crawl, which it then stores with the search request in a search request history.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A computer based method of retrieving information from a computer network (Web) having a plurality of electronic documents stored thereon, wherein each electronic document has a corresponding document address specification that provides information for locating the electronic document, the method including performing a current Web crawl comprising:

assigning a current crawl number to the current Web crawl, said current crawl number being the next number in a numerical sequence of numbers;

determining whether an electronic document has been retrieved during a previous Web crawl and associated with a crawl number modified;

if the electronic document has not been retrieved during a previous Web crawl and associated with a crawl number modified, associating the current crawl number with the electronic document as its crawl number modified;

if the electronic document has been retrieved during a previous Web crawl and associated with a crawl number modified, determining whether the actual content of the electronic document has been modified subsequent to the previous retrieval; and if the actual content of the electronic document has been modified subsequent to the previous retrieval, associating the current crawl number with the electronic document as its crawl number modified.

2. The method of claim 1, wherein determining whether the actual content of the electronic document has been modified subsequent to the previous retrieval comprises:

determining whether the electronic document has an associated time stamp matching a previously stored time stamp associated with the electronic document;

if the electronic document does not have an associated time stamp matching the previously stored time stamp, retrieving the electronic document by using a document address specification; and if the electronic document has an associated time stamp matching the previously stored time stamp, not retrieving the electronic document.

3. The method of claim 1, wherein determining whether the actual content of the electronic document has been modified subsequent to the previous retrieval comprises:

determining current representation data corresponding to the electronic document; and comparing the current representation data corresponding to the electronic document with previous representation data corresponding to the electronic document and determined prior to performing the current Web crawl.

4. The method of claim 3, wherein the current representation data is a hash value and determining the representation data comprises performing a hash function.

5. The method of claim 4, wherein the hash function is a secure hash function.

6. The method of claim 3, wherein determining representation data comprises:

filtering out selected data from the electronic document; and determining representation data representative of data from the electronic document that has not been filtered out.

7. The method of claim 6, wherein filtering out selected data includes filtering out text format specification data.

8. The method of claim 1, wherein determining whether the actual content of the electronic document has been modified subsequent to the previous retrieval comprises:

(a) determining whether the electronic document has an associated time stamp matching a previously stored time stamp associated with the electronic document;

(b) if the electronic document does not have an associated time stamp matching the previously stored time stamp, performing a document comparison by:
(i) retrieving the electronic document;
(ii) determining current representation data corresponding to the electronic document; and
(iii) comparing the current representation data corresponding to the electronic document with previous representation data corresponding to the electronic document and determined prior to the current Web crawl.

9. The method of claim 2, wherein determining whether the actual content of the electronic document has been modified subsequent to the previous retrieval further comprises:

sending a request to a server to transfer the electronic document, wherein the transfer is based on whether the time stamp associated with the electronic document is more recent than a time stamp included in the request; and in the event that the server does not transfer the electronic document, determining that the electronic document has not been modified.

10. The method of claim 1, further comprising:

receiving a request to retrieve a list of electronic documents that match a query, wherein the query includes a criteria to match electronic documents that have been modified subsequent to performing a previous Web crawl; and in response to receiving the request to retrieve a list of electronic documents, retrieving a set of document address specifications corresponding to electronic documents having an associated crawl number modified assigned to the current Web crawl.

11. The method of claim 1, further comprising:

receiving a request to retrieve a list of electronic documents that have been modified subsequent to performing a previous Web crawl; and in response to receiving the request to retrieve a list of electronic documents, retrieving a set of document address specifications corresponding to electronic documents having an associated crawl number modified assigned to a crawl more recent than said previous Web crawl.

12. The method of claim 1, further comprising:

receiving, prior to performing the current Web crawl, a first request to retrieve a list of electronic documents that match a specified criteria;

in response to receiving the first request, providing a list of electronic documents that match the specified criteria;

receiving, after the current Web crawl, a second request to retrieve a list of electronic documents that match the specified criteria;

in response to receiving the second request, retrieving a second list of electronic documents that were modified after the current Web crawl and that match the first specified criteria; and providing the second list of electronic documents.

13. The method of claim 1, wherein performing the current Web crawl further comprises:

(a) determining at least one hyperlink contained within the electronic document, each hyperlink including a hyperlink document address specification;

(b) determining whether each hyperlink document address specification included corresponds to an electronic document retrieved prior to the current Web crawl;

(c) in the event that the hyperlink document address specification corresponds to a linked electronic document retrieved prior to the current Web crawl, processing the hyperlink document address specification, said processing comprising:

(i) determining whether the actual content of the linked electronic document has been modified subsequent to the prior retrieval of the electronic document; and (ii) in the event that the actual content of the linked electronic document has been modified, storing data from the linked electronic document and associating the current crawl number to the linked electronic document.

14. A computer based method of retrieving information from a computer network (Web) having a plurality of electronic documents stored thereon, wherein each electronic document has a corresponding document address specification that provides information for locating the electronic document, the method comprising:

(a) performing a Web crawl, wherein performing the Web crawl includes:

(i) assigning a current crawl number to the Web crawl, said current crawl number establishing an order in which the Web crawl occurred;

(ii) retrieving at least a portion of information contained within each of a plurality of electronic documents that have not previously been retrieved in a prior Web crawl;

(iii) retrieving at least a portion of information contained within each of a plurality of electronic documents that have been modified subsequent to a prior Web crawl; and (iv) storing, in an index, the information retrieved from each of the plurality of electronic documents that have not been previously retrieved in a prior Web crawl and each of the plurality of electronic documents that have been modified subsequent to a prior Web crawl and associating the information with a crawl number modified that corresponds to the current crawl number assigned to the Web crawl; and (b) in response to receiving, subsequent to said Web crawl, a request to retrieve a list of electronic documents that have been modified subsequent to said prior Web crawl, selectively retrieving, from the index, said information corresponding to electronic documents that have a corresponding crawl number modified that exceeds the current crawl number of the said prior Web crawl.

15. The method of claim 14, selectively retrieving, from the index, said information corresponding to electronic documents that have a corresponding crawl number modified that exceeds the current crawl number of the said prior Web crawl, comprises retrieving portions of information contained within said electronic documents having an associated crawl number modified that exceeds the current crawl number of the said prior Web crawl.

16. A computer-readable medium having computer-executable instructions for retrieving information from a computer network (Web), wherein retrieving information from the computer network includes performing a current Web crawl, wherein performing the current Web crawl comprises:

assigning a current crawl number to the current Web crawl, said current crawl number establishing an order in which the Web crawl occurred;

receiving a document address specification corresponding to an electronic document stored on the computer network;

determining whether the electronic document has been retrieved during a previous Web crawl;

if the electronic document has not been retrieved during a previous Web crawl, storing data from the electronic document and associating the data from the electronic document with a crawl number modified corresponding to the current crawl number assigned to the current Web crawl;

if the electronic document has been retrieved during a previous Web crawl, determining whether the actual content of the electronic document has been modified subsequent to the previous Web crawl; and if the actual content of the electronic document has been modified subsequent to the previous Web crawl, storing data from the electronic document and associating the data from the electronic document with a crawl number modified corresponding to the current crawl number assigned to the current Web crawl.

17. The computer-readable medium of claim 16, wherein the computer-executable instructions for determining whether the actual content of the electronic document has been modified comprises computer-executable instructions for:

retrieving the electronic document;

calculating a current hash value corresponding to the electronic document;

comparing the current hash value with a previously determined hash value corresponding to the electronic document;

if the current hash value matches the previously determined hash value, determining that the actual content of the electronic document is not modified; and if the current hash value does not match the previously determined hash value, determining that the actual content of the electronic document is modified.

18. The computer-readable medium of claim 16, wherein the computer-executable instructions for determining whether the actual content of the electronic document has been modified comprises computer-executable instructions for:

filtering out selected data from the electronic document; and calculating the current hash value based on data from the electronic document that has not been filtered out.

19. The computer-readable medium of claim 16, having further computer-executable instructions for:
receiving a request to retrieve a list of electronic documents that have been modified subsequent to performing a previous Web crawl; and
in response to receiving the request to retrieve a list of electronic documents, retrieving a set of document address specifications corresponding to electronic documents having an associated crawl number modified that is equal to or greater than the current crawl number assigned to the previous Web crawl.

20. The computer-readable medium of claim 16, having further computer-executable instructions for:
receiving a request to retrieve a list of electronic documents that have been modified subsequent to performing a previous Web crawl; and
in response to receiving the request to retrieve a list of electronic documents, filtering out document address specifications corresponding to electronic documents having an associated crawl number modified that matches the current crawl number assigned to said previous Web crawl.

21. A system for retrieving information stored on a computer network (Web), the system comprising:
(a) a computer network (Web) including at least one server having a plurality of electronic documents stored thereon, including a first electronic document, each electronic document having a corresponding Web address;
(b) a database containing information corresponding to the plurality of electronic documents, including information corresponding to the first electronic document; and
(c) a crawler program for performing a current Web crawl, the crawler program comprising computer-executable instructions for:
(i) assigning a current crawl number to the current Web crawl, the current crawl number establishing an order in which the Web crawl occurred;
(ii) retrieving a Web address corresponding to the first electronic document;
(iii) determining whether the first electronic document has information corresponding to it in the database;
(iv) if the first electronic document does not have information corresponding to it in the database, storing information corresponding to the first electronic document in the database, including a crawl number modified that corresponds to the current crawl number;
(v) if the first electronic document has information corresponding to it in the database, determining whether the first electronic document is more recent than the database information corresponding to the first electronic document; and
(vi) if the first electronic document is more recent than the database information corresponding to the first electronic document, storing information corresponding to the first electronic document in the database, including a crawl number modified that corresponds to the current crawl number.

22. The system of claim 21, wherein the crawler program further comprises computer-executable instructions for:
retrieving a previously calculated hash value corresponding to the first electronic document from the database;
calculating a new hash value corresponding to the first electronic document; and
if the new hash value is different from the previously calculated hash value, determining that the first electronic document is more recent than the database information corresponding to the first electronic document.

23. The system of claim 21, wherein the crawler program further comprises computer-executable instructions for filtering the first electronic document to exclude a portion of the data contained within the first electronic document prior to calculating the new hash value corresponding to the first electronic document.

24. The system of claim 21, further comprising a search engine containing computer-executable instructions for:
determining a set of electronic documents corresponding to a specified criteria, the specified criteria including a specification of a crawl number modified; and
retrieving a list of electronic documents based on the specified criteria, including the specification of the crawl number modified.

25. The method as recited in claim 14, wherein the crawl number is a next number in a numerical sequence of numbers.

26. The computer-readable medium as recited in claim 16, wherein the crawl number is a next number in a numerical sequence of numbers.

27. The system as recited in claim 21, wherein the crawl number is a next number in a numerical sequence of numbers.

28. A computer based method of retrieving information from a computer network (Web) having a plurality of electronic documents stored thereon, wherein each electronic document has a corresponding document address specification that provides information for locating the electronic document, the method comprising:
(a) performing a Web crawl, wherein performing the Web crawl includes:
(i) assigning a current crawl number to the Web crawl, said current crawl number establishing an order in which the Web crawl occurred;
(ii) retrieving at least a portion of information contained within each of a plurality of electronic documents that have not previously been retrieved in a prior Web crawl;
(iii) retrieving at least a portion of information contained within each of a plurality of electronic documents that have been modified subsequent to a prior Web crawl; and
(iv) storing, in an index, the information retrieved from each of the plurality of electronic documents that have not been previously retrieved in a prior Web crawl and each of the plurality of electronic documents that have been modified subsequent to a prior Web crawl and associating the information with a crawl number modified that corresponds to the current crawl number assigned to the Web crawl; and
(b) obtaining a request to retrieve of list of electronic documents that have been modified subsequent to an identified Web crawl;
(c) associating a crawl number with the identified Web crawl; and
(d) selectively retrieving, from the index, information corresponding to electronic documents that have a corresponding crawl number modified that exceeds the current crawl number of the crawl number associated with the identified Web crawl.

29. The method as recited in claim 28, wherein assigning a current crawl number includes assigning a next number in a numerical sequence of numbers.

* * * * *

UNITED STATES PATENT AND TRADEMARK OFFICE
CERTIFICATE OF CORRECTION

PATENT NO.    : 6,638,314 B1
DATED         : October 28, 2003
INVENTOR(S)   : D. Meyerzon et al.

It is certified that error appears in the above-identified patent and that said Letters Patent is hereby corrected as shown below:

Title page, Item [54] and Column 1, lines 1-2,
Title "METHOD OF WEB CRAWLING UTILIZING CRAWL NUMBERS" should read -- RETRIEVING NEW AND UPDATED DOCUMENTS BASED ON COMPARISON OF SEQUENTIAL WEB CRAWL NUMBERS --

Column 1,
Line 31, "documents, A" should read -- documents. A --
Line 33, "number of formats" should read -- number of formats, --
Line 61, "a specified criteria." should read -- specified criteria.--

Column 3,
Line 22, "document and stored in" should read -- document in --
Line 67, "web" should read -- Web --

Column 4,
Lines 12, 14 and 16, "timestamp" should read -- time stamp --
Line 18, "DRAWING" should read -- DRAWINGS --
Line 65, "files systems," should read -- file systems, --

Column 5,
Line 4, "an first" should read -- a first --
Line 24, "retrieved document." should read -- retrieved documents. --
Line 67, "Save" should read -- have --

Column 6,
Line 7, "Although not required," should read -- Although it is not required, --
Line 37, "that helps" should read -- that help --
Line 43, "disk 31" should read -- disk 31, --
Line 44, "CD ROM" should read -- CD-ROM --
Line 50, "computer readable" should read -- computer-readable--
Line 59, "(ROM)," should read -- (ROMs), --

Column 7,
Line 24, "52," should read -- 52. --

Column 8,
Line 42, "Also" should read -- Also, --

UNITED STATES PATENT AND TRADEMARK OFFICE
CERTIFICATE OF CORRECTION

PATENT NO. : 6,638,314 B1
DATED : October 28, 2003
INVENTOR(S) : D. Meyerzon et al.

It is certified that error appears in the above-identified patent and that said Letters Patent is hereby corrected as shown below:

Column 9,
Line 25, "another other" should read -- another --

Column 11,
Line 12, "RFC 1321." should read -- RFC 1321. --
Line 29, "the creates" should read -- that creates --
Line 49, "know" should read -- known --
Lines 50 AND 51, "web" should read -- Web --
Line 59, "modified filed" should read -- modified field --

Column 12,
Line 21, "below to with" should read -- below with --
Line 39, "base on" should read -- based on --

Column 13,
Line 66, "10 16" should read -- 1016 --

Column 14,
Line 5, "web" should read -- Web --
Line 16, "error code filed" should read -- error code field --
Line 23, "tile" should read -- the --

Column 15,
Line 27, "update it" should read -- update at --
Line 34, "then" should read -- than --
Line 39, "810 does not" should read -- 810 do not --
Line 45, "FIG." should read -- FIGS.--
Line 52, "web" should read -- Web --

Column 17,
Line 4, "A "match" includes" should read -- A "match" includes --

UNITED STATES PATENT AND TRADEMARK OFFICE
CERTIFICATE OF CORRECTION

PATENT NO. : 6,638,314 B1
DATED : October 28, 2003
INVENTOR(S) : D. Meyerzon et al.

It is certified that error appears in the above-identified patent and that said Letters Patent is hereby corrected as shown below:

Column 22,
Line 53, "retrieve of list" should read -- retrieve a list --

Signed and Sealed this

Twentieth Day of July, 2004

JON W. DUDAS
*Acting Director of the United States Patent and Trademark Office*